US012776799B2

(12) United States Patent
Lee et al.

(10) Patent No.: US 12,776,799 B2
(45) Date of Patent: Oct. 27, 2026

(54) METHOD AND ELECTRONIC DEVICE FOR TIME-AVERAGED SPECIFIC ABSORPTION RATE (TA-SAR) OPTIMIZATION

(71) Applicant: MEDIATEK INC., Hsinchu City (TW)

(72) Inventors: Cheng-Han Lee, Hsinchu City (TW); Yu-Han Cheng, Hsinchu City (TW); Chih-Wei Lee, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 461 days.

(21) Appl. No.: 18/354,933

(22) Filed: Jul. 19, 2023

(65) Prior Publication Data

US 2025/0030446 A1 Jan. 23, 2025

(51) Int. Cl.

*H04B 1/00* (2006.01)
*H04B 1/3827* (2015.01)
*H04W 52/22* (2009.01)
*H04W 52/36* (2009.01)

(52) U.S. Cl.

CPC ........ *H04B 1/3838* (2013.01); *H04W 52/225* (2013.01); *H04W 52/367* (2013.01)

(58) Field of Classification Search

CPC ...... H04B 1/3838; H04B 1/40; H04B 1/0458; H04W 52/225; H04W 52/367
See application file for complete search history.

(56) References Cited

U.S. PATENT DOCUMENTS

2020/0044612 A1* 2/2020 Bologna .............. H04B 1/3838
2022/0029275 A1* 1/2022 Zhang .................. H04B 1/3838
2022/0123776 A1* 4/2022 Koki .................... H04B 1/3888
2024/0204816 A1* 6/2024 Cai ...................... H04B 1/3838
2024/0205844 A1* 6/2024 El Hajj ............... H04W 52/146
2024/0214022 A1* 6/2024 Aagiru ................ H04W 52/367

* cited by examiner

*Primary Examiner* — Ping Y Hsieh
(74) *Attorney, Agent, or Firm* — McClure, Qualey & Rodack, LLP

(57) ABSTRACT

A method for TA-SAR optimization with an antenna tuner is provided. The antenna tuner has multiple tuner states. An instant SAR level that is higher than a threshold SAR level is calculated. A suitable tuner among the multiple tuner states is determined based on the instant SAR level. The tuner is switched to the suitable tuner state to transmit signals with the TX power level corresponding to the suitable tuner state.

14 Claims, 6 Drawing Sheets

METHOD AND ELECTRONIC DEVICE FOR TIME-AVERAGED SPECIFIC ABSORPTION RATE (TA-SAR) OPTIMIZATION

CROSS REFERENCE TO RELATED APPLICATIONS

Background of the Invention

Field of the Invention

The present invention relates to a method for time-averaged specific absorption rate (TA-SAR) optimization, and, in particular, to a method for TA-SAR optimization with an antenna tuner.

Description of the Related Art

RF exposure is correlated to transmission (TX) power. For example, lower RF exposure is correlated to lower TX power. The TX power can be controlled to meet RF exposure limit. The prior time-averaged specific absorption rate (TA-SAR) algorithm controls instantaneous TX power for operating frequencies less than 10 GHz, so that the total time-averaged RF exposures (i.e., SAR) are less than the limitation.

However, if the base station detects that the TX power of a device under test (DUT), for example, a user equipment (UE) changes too much, the base station may punish the UE to limit the transmission resources, so that the transmission speed for the UE becomes lower.

BRIEF SUMMARY OF THE INVENTION

An embodiment of the present invention provides a method for TA-SAR optimization with an antenna tuner. The antenna tuner has multiple tuner states. The method includes the following stages. An instant SAR level that is higher than a threshold SAR level is calculated. A suitable tuner state among the multiple tuner states is determined based on the SAR level. The tuner is switched to the suitable tuner state to transmit signals with the TX power level corresponding to the suitable tuner state.

The method for image alignment further includes the following stages. The TX power level corresponding to a current tuner state is adjusted if there is no suitable tuner state among the multiple tuner states. One of the tuner states is the current tuner state.

The method for image alignment further includes the following stages. The suitable tuner state is set as the current tuner state. The variation of voltage standing wave ratio (VSWR) corresponding to the current tuner state is detected.

According to the method described above, the threshold SAR level is determined by a second table. The second table records the threshold SAR level corresponding to different scenes. The second table is a SAR ECI table.

The method for image alignment further includes the following stages. It is determined that there is scene variation. The second table is switched based on the scene variation to obtain the threshold SAR level before performing the calculating step.

The method for image alignment further includes the following stages. It is determined that there is no scene variation before performing the calculating step.

According to the method described above, the threshold SAR level is an average SAR level within a time window.

The method for image alignment further includes the following stages. The variation of voltage standing wave ratio (VSWR) corresponding to the current tuner state is detected after calculating the instant SAR level that is lower than the threshold SAR level.

The method for image alignment further includes the following stages. It is calculated whether the instant SAR level is higher than the threshold SAR level after adjusting the TX power level corresponding to the current tuner state.

An embodiment of the present invention provides an electronic device. The electronic device includes an antenna tuner and an RF modem. The antenna tuner has multiple tuner states. The RF modem is electrically connected to the antenna tuner. The RF modem calculates an instant SAR level that is higher than a threshold SAR level, a suitable tuner state among the tuner states is determined based on the instant SAR level, and sends a setting command related to the suitable tuner state to the antenna tuner. The antenna tuner is switched to the suitable tuner state to transmit signals with the TX power level corresponding to the suitable tuner state according to the setting command.

According to the electronic device described above, the RF modem adjusts the TX power level corresponding to the current tuner state if the RF modem determines there is no suitable tuner state among the multiple tuner states. One of the tuner states is an current tuner state.

According to the electronic device described above, the RF modem sends the signals with the TX power level corresponding to the current tuner state to the antenna tuner for transmission.

According to the electronic device described above, the RF modem sets the suitable tuner state as the current tuner state, and detects the variation of voltage standing wave ratio (VSWR) corresponding to the current tuner state.

According to the electronic device described above, the RF modem obtains a second table. The threshold SAR level is determined by the second table. The second table records the threshold SAR level corresponding to different scenes. The second table is a SAR ECI table.

According to the electronic device described above, the RF modem determines there is scene variation, and switches the second table based on the scene variation to obtain the threshold SAR level before calculating the instant SAR level.

According to the electronic device described above, the RF modem determines there is no scene variation before calculating the instant SAR level.

According to the electronic device described above, the threshold SAR level is an average SAR level within a time window.

According to the electronic device described above, the RF modem keeps detecting the variation of voltage standing wave ratio (VSWR) corresponding to the current tuner state after calculating the instant SAR level that is lower than the threshold SAR level.

According to the electronic device described above, the RF modem calculates whether the instant SAR level is higher than the threshold SAR level after adjusting the TX power level corresponding to the current tuner state.

According to the electronic device described above, the RF modem includes a tuner control unit, a tuner time-averaged (TA) unit, and a power TA unit. The tuner control unit receives the current tuner state from the antenna tuner, and determines there is the suitable tuner state among the multiple tuner states based on the SAR level. The tuner TA unit detects the variation of VSWR corresponding to the current tuner state, calculates whether the instant SAR level is higher than the threshold SAR level, and sends a setting command related to the suitable tuner state to the antenna tuner. The power TA unit adjusts the TX power level corresponding to the current tuner state.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
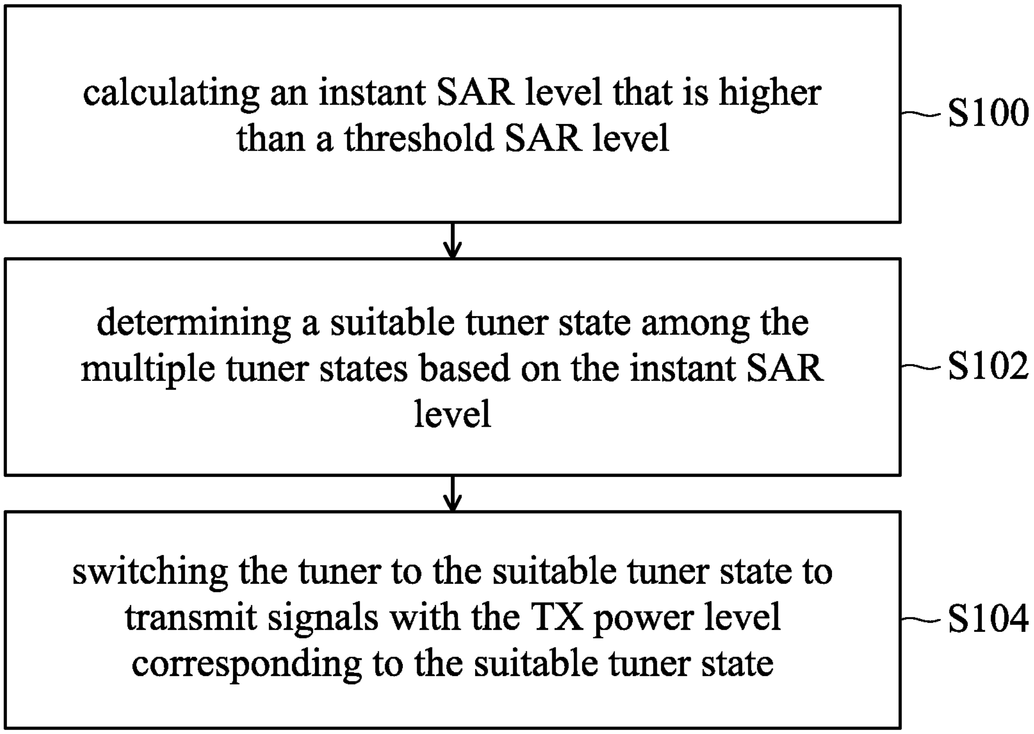
FIG. 1 is a flow chart of a method for time-averaged specific absorption rate (TA-SAR) optimization in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

FIG. 1 is a flow chart of a method for time-averaged specific absorption rate (TA-SAR) optimization in accordance with some embodiments of the present invention. The method for TA-SAR optimization in FIG. 1 is applied to an electronic device with an antenna tuner and an RF modem. In some embodiments, the antenna tuner has multiple tuner states. One of the tuner states is an current tuner state. Each tuner state of the antenna tuner corresponds to a SAR level and a power level measured or calculated by the electronic device. As shown in FIG. 1, the method for TA-SAR optimization of the present invention includes the following stages. A first table is generated, and the first table records the SAR level and the transmitting (TX) power level corresponding to each of the tuner states (step S100). An instant SAR level that is higher than a threshold SAR level is calculated (step S102). It is determined that there is a suitable tuner state among the multiple tuner states based on the SAR level (step S104). The tuner is switched to the suitable tuner state to transmit signals with the TX power level corresponding to the suitable tuner state (step S106).

Table 1 as shown below is an example of the first table in step S100.

TABLE 1

| Tuner state | SAR level (W/Kg) | Power level (dBm) |
|---|---|---|
| A | 6 | 23 |
| B | 3 | 23 |
| C | 2 | 23 |
| D | 1 | 23 |
| E | 0.5 | 23 |

According to Table 1, when the antenna tuner is in tuner state A, the TX power of the electronic device is 23 dBm resulting in 6 W/Kg of SAR level. When the antenna tuner is in tuner state B, the TX power of the electronic device is 23 dBm resulting in 3 W/Kg of SAR level. When the antenna tuner is in tuner state C, the TX power of the electronic device is 23 dBm resulting in 2 W/Kg of SAR level. When the antenna tuner is in tuner state D, the TX power of the electronic device is 23 dBm resulting in 1 W/Kg of SAR level. When the antenna tuner is in tuner state E, the TX power of the electronic device is 23 dBm resulting in 0.5 W/Kg of SAR level. In some embodiments, the antenna tuner is electrically connected to an antenna. When the tuner state of the antenna tuner is changed, the return loss of the antenna and the efficiency of the antenna are changed. Therefore, in the example of Table 1, that's why the TX power level of the electronic device remains the same in different tuner state, but the SAR levels in different tuner state are different.

In step S102, an instant SAR is calculated by the electronic device. In some embodiments, the threshold SAR level in step S102 is determined by a second table. The second table records the threshold SAR level corresponding to different scenes for certification standards. In some embodiments, the second table is a SAR ECI table, but the present invention is not limited thereto. In step S102, the method for TA-SAR optimization of the present invention compares the instant SAR level and the threshold SAR level recorded in the second table, and determines that the instant SAR level is higher than the threshold SAR level. In step S104, the method for TA-SAR optimization of the present invention determines whether there is a suitable tuner state based on the SAR level.

For example, refer to Table 1, it is assumed that the current tuner state is tuner state C. Since the SAR levels of the tuner states D and E are lower than the SAR level of the tuner state C, the method for TA-SAR optimization of the present invention determines that tuner states D and E are suitable tuner states. Since the SAR level of tuner state E is lower than that of tuner state D, tuner state E has higher priority to be served as the suitable tuner state, but the present invention is not limited thereto. Therefore, in step S106, the current tuner state is tuner state C and the suitable tuner state is tuner state E. The method for TA-SAR optimization of the present invention switches the tuner state C to the tuner state E, and transmits signals of 23 dBm corresponding to the tuner state E.

Figure 2:
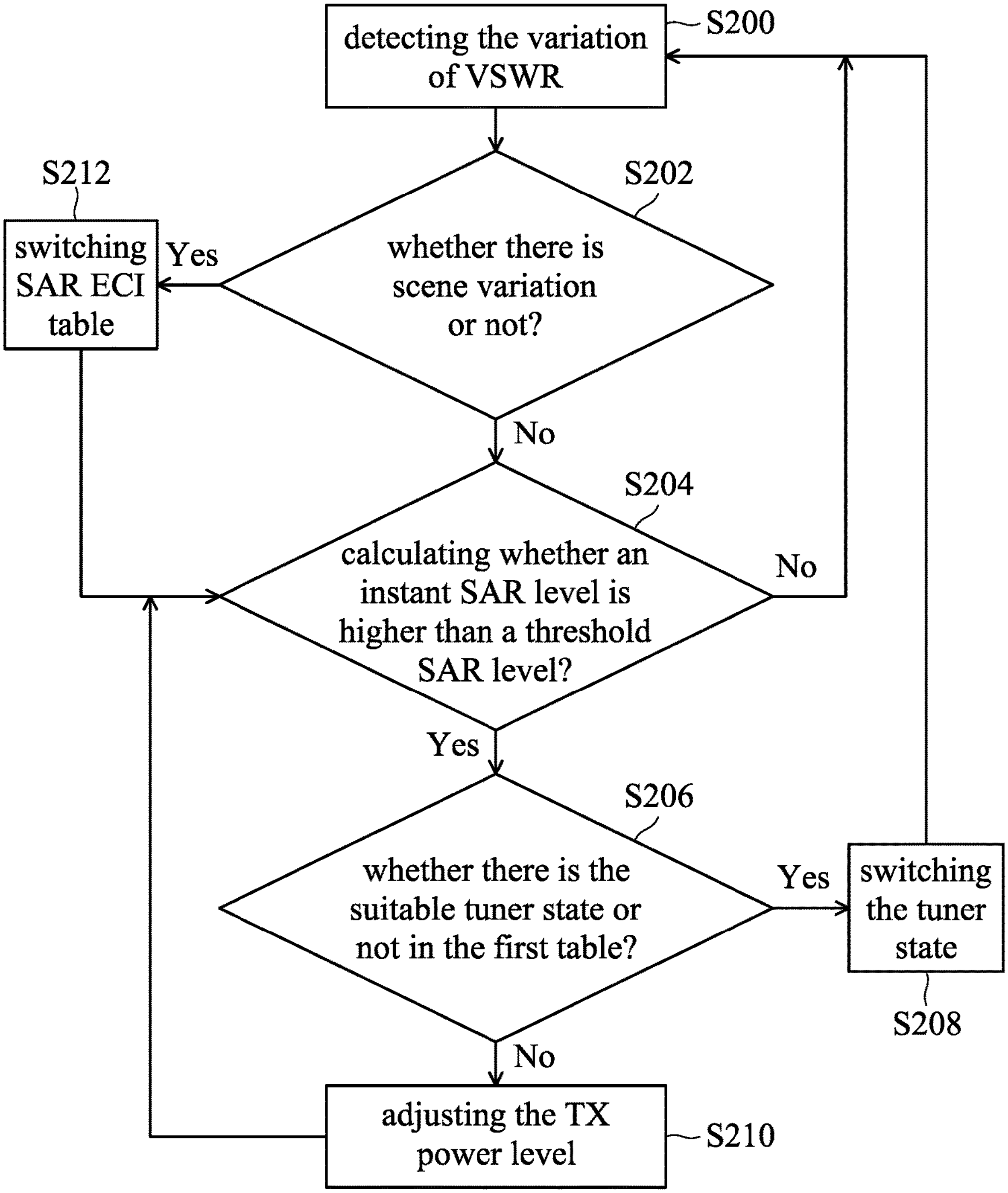
FIG. 2 is a flow chart of the method for TA-SAR optimization in accordance with some embodiments of the present invention.

FIG. 2 is a flow chart of the method for TA-SAR optimization in accordance with some embodiments of the present invention. The method for TA-SAR optimization in FIG. 2 is applied to an electronic device with an antenna tuner and an RF modem. In some embodiments, the antenna tuner has multiple tuner states. One of the tuner states is an current tuner state. Each tuner state of the antenna tuner corresponds to a SAR level and a power level measured or calculated by the electronic device. In some embodiments, the tuner states are stored in a first table, such as Table 1. As shown in FIG. 2, the method for TA-SAR optimization of the present invention includes the following stages. The variation of voltage standing wave ratio (VSWR) corresponding to the current tuner state is detected (step S200). In some embodiments, the method for TA-SAR optimization of the present invention may first calculate the return loss corresponding to the current tuner state, and convert the return loss into the VSWR, but the present invention is not limited thereto. It is determined whether there is scene variation or not (step S202).

If there is the scene variation in step S202, a second table is switched (step S212). In some embodiments, the threshold SAR level is determined by the second table. The second table records the threshold SAR level corresponding to different scenes. The second table is a SAR ECI table, but the present invention is not limited thereto. After step S212 is performed, the method for TA-SAR optimization of the present invention performs step S204. In some embodiments, if there is no scene variation in step S202, an instant SAR level is calculated, and it is determined whether the instant SAR level is higher than a threshold SAR level (step S204). If the instant SAR level is not higher than the threshold SAR level in step S204, the method for TA-SAR optimization of the present invention keeps performing step S200. If the instant SAR level is higher than the threshold SAR level in step S204, it is determined whether there is the suitable tuner state or not in the first table (step S206).

If there is the suitable tuner state in the first table in step S206, the tuner state is switched from the current tuner state to the suitable tuner state (step S208). After the tuner state is switched, the method for TA-SAR optimization of the present invention sets the suitable tuner state as the current tuner state, and keeps performing step S200. If there is no suitable tuner state in the first table in step S206, the TX power level corresponding to the current tuner state is adjusted (step S210). After the TX power level corresponding to the current tuner state is adjusted, the method for TA-SAR optimization of the present invention keeps performing step S204.

Figure 3:
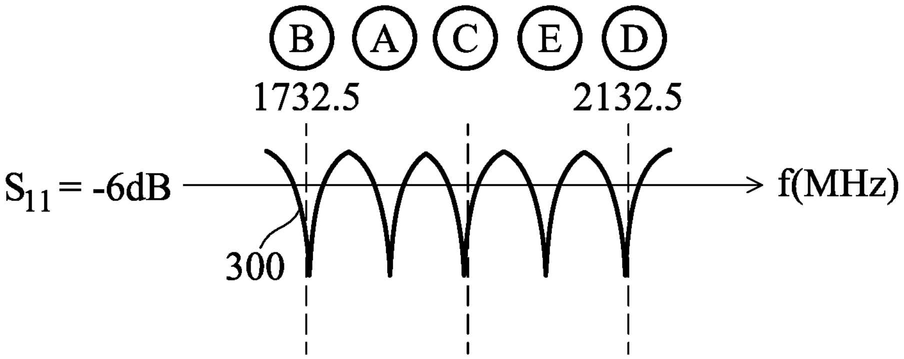
FIG. 3 is a relationship diagram of a return loss curve 300 and multiple tuner states in accordance with some embodiments of the present invention.

FIG. 3 is a relationship diagram of a return loss curve 300 and multiple tuner states in accordance with some embodiments of the present invention. Please refer to FIG. 1 and FIG. 3 at the same time. The horizontal axis of FIG. 3 is frequency, and the vertical axis of FIG. 3 is the return loss. As shown in FIG. 3, a line is marked at return loss of −6 dB, for example, the line S11. The return loss curve 300 has 5 deep points at 5 different frequencies. Each of the 5 deep points has minimum return loss compared with other points on return loss curve 300. Each deep point represents the return loss of one tuner state. For example, the first deep point from the left of the return loss curve 300 represents the return loss of tuner state B in Table 1. The second deep point from the left of the return loss curve 300 represents the return loss of tuner state A in Table 1. The third deep point from the left of the return loss curve 300 represents the return loss of tuner state C in Table 1. The fourth deep point from the left of the return loss curve 300 represents the return loss of tuner state E in Table 1. The fifth deep point from the left of the return loss curve 300 represents the return loss of tuner state D in Table 1. In some embodiments, the first deep point of the return loss curve 300 is at 1732.5 MHz, the fifth deep point of the return loss curve 300 is at 2132.5 MHz, but the present invention is not limited thereto. As shown in FIG. 3, when the tuner state of the antenna tuner is changed, the return loss of the antenna is changed.

Figure 4:
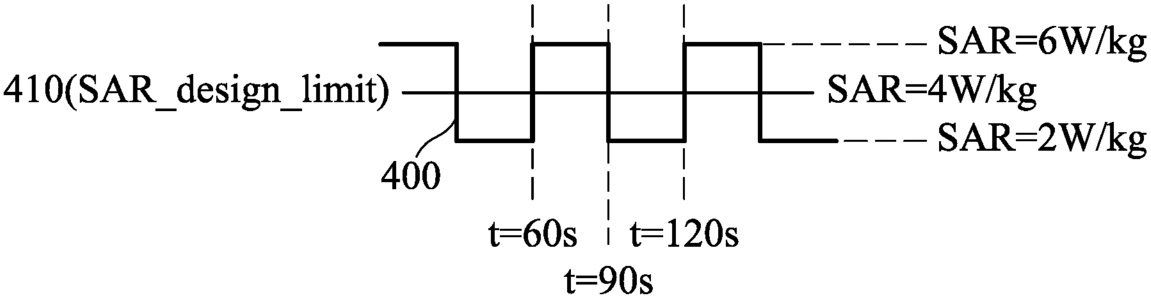
FIG. 4 is a relationship diagram of an instant SAR level 400 and a threshold SAR level 410 in accordance with some embodiments of the present invention.

FIG. 4 is a relationship diagram of an instant SAR level 400 and a threshold SAR level 410 in accordance with some embodiments of the present invention. The horizontal axis of FIG. 4 is time, and the vertical axis of FIG. 4 is the instant SAR level. In some embodiments, the threshold SAR level 410 (SAR_design_limit) is determined by the SAR ECI table for certification standards. For example, the threshold SAR level 410 in FIG. 4 is equal to 4 W/Kg, but the present invention is not limited thereto. In some embodiments, the threshold SAR level 410 is an average SAR level within a time window. The period from time 60 s to time 120 s is focus to be an example. Please refer to FIG. 4 and Table 1 at the same time. For the period from time 60 s to 90 s, tuner state A is adopted, thus the instant SAR level from time 60 s to 90 s is equal to 6 W/Kg. Next, for the period from time 90 s to 120 s, tuner state C is adopted, thus the instant SAR level from time 90 s to 120 s is equal to 2 W/Kg. The average SAR level from time 60 s to 120 s is then calculated, which is equal to 4 W/Kg. Since the average SAR level from time 60 s to 120 s does not exceed the threshold SAR level 410, the certification standards are met.

Table 2 shows the changes of the power level and the instant SAR level when the tuner state is switched.

TABLE 2

| Step | Tuner state | Power level (dBm) | Instant SAR level (W/Kg) |
|---|---|---|---|
| #0 | A | 23 | 6 |
| #1 | A | 20 | 3 |
| #2 | B | 20 | 1.5 |
| #3 | B | 17 | 0.75 |

Please refer to Table 1 and Table 2 at the same time. As shown in Table 2, in step #0, the current tuner state is tuner state A, thus the TX power level of the electronic device is 23 dBm resulting in 6 W/Kg of SAR level. Next, the method for TA-SAR optimization of the present invention determines that there is no suitable tuner state in step S206 in FIG. 2, and performs step S210 directly to decrease the TX power level by 3 dB, resulting in 3 W/Kg attenuation of SAR level from 6 W/Kg to 3 W/Kg. In step #2, the method for TA-SAR optimization of the present invention determines that there is suitable tuner state in step S206 in FIG. 2, and performs step S208 in FIG. 2 to switch the tuner state A to the tuner state B resulting in 1.5 W/Kg attenuation of SAR level from 3 W/Kg to 1.5 W/Kg. In step #3, the method for TA-SAR optimization of the present invention determines that there is no suitable tuner state in step S206 in FIG. 2, and performs step S210 directly to decrease the TX power level by 3 dB, resulting in 0.75 W/Kg attenuation of SAR level from 1.5 W/Kg to 0.75 W/Kg. Table 2 discloses that the method for TA-SAR optimization of the present invention either switches the tuner state or adjusts (or decreases) the TX power level to decease the instant SAR level.

Figure 5:
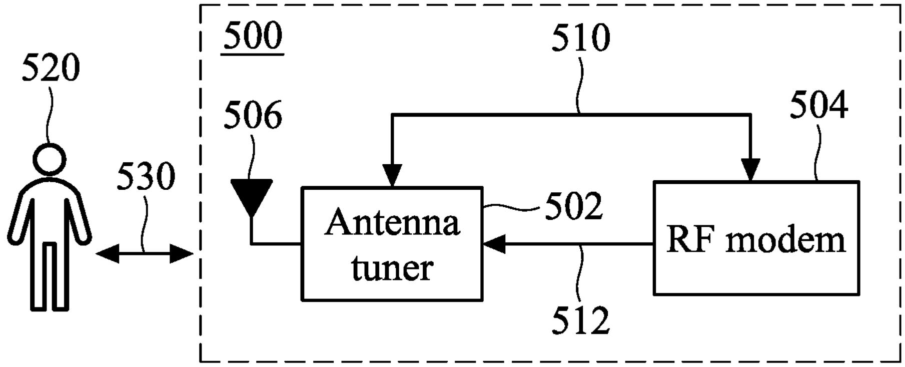
FIG. 5 is a schematic diagram of an electronic device 500 in accordance with some embodiments of the present invention.

FIG. 5 is a schematic diagram of an electronic device 500 in accordance with some embodiments of the present invention. As shown in FIG. 5, the electronic device 500 includes an antenna tuner 502, an RF modem 504, and an antenna 506. The antenna tuner is electrically connected between the antenna 506 and the RF modem. In some embodiments, the antenna tuner 502 has multiple tuner states, and one of the tuner states is an current tuner state. The RF modem 504 obtains a first table (such as Table 1). The first table records a SAR level and a TX power level corresponding to each of the tuner states. In some embodiments, the RF modem 504 calculates an instant SAR level that is higher than a threshold SAR level, determines there is a suitable tuner state among the multiple tuner states based on the SAR level between the suitable tuner state and the current tuner state, and sends a setting command related to the suitable tuner state to the antenna tuner through a communication protocol 510. In some embodiments, the RF modem 504 sends signals with the TX power level corresponding to the current tuner state to the antenna tuner 502 for transmission. In some embodiments, the antenna tuner 502 switches the current tuner state to the suitable tuner state to transmit the signals with the TX power level corresponding to the suitable tuner state to the antenna 506 according to the setting command.

In some embodiments, the RF modem 504 adjusts the TX power level corresponding to the current tuner state if the RF modem 504 determines there is no suitable tuner state among the multiple tuner states. In some embodiments, the RF modem 504 sets the suitable tuner state as the current tuner state, and detects the variation of voltage standing wave ratio (VSWR) corresponding to the current tuner state. In some embodiments, the RF modem 504 first calculates the return loss corresponding to the current tuner state, and converts the return loss into the VSWR, but the present invention is not limited thereto. In some embodiments, the RF modem obtains a second table. The threshold SAR level is determined by the second table. The second table records the threshold SAR level corresponding to different scenes. The second table is a SAR ECI table, but the present invention is not limited thereto. In some embodiments, the threshold SAR level is an average SAR level within a time window. In some embodiments, the RF modem determines there is scene variation, and switches the second table based on the scene variation to obtain the threshold SAR level before calculating the instant SAR level. As shown in FIG. 5, a person 520 makes close or far away from the electronic device. That is, since the distance 530 between the person 520 and the electronic device 500 changes, the scene variation may happen. In some embodiments, the scene variation may also happen when Wi-Fi function or Bluetooth function of the electronic device 500 is turned on, but the present invention is not limited thereto.

In some embodiments, the RF modem 504 determines there is no scene variation before calculating the instant SAR level. In some embodiments, the RF modem 504 keeps detecting the variation of voltage standing wave ratio (VSWR) corresponding to the current tuner state after calculating the instant SAR level that is lower than the threshold SAR level. In some embodiments, the RF modem 504 calculates whether the instant SAR level is higher than the threshold SAR level after adjusting the TX power level corresponding to the current tuner state.

Figure 6:
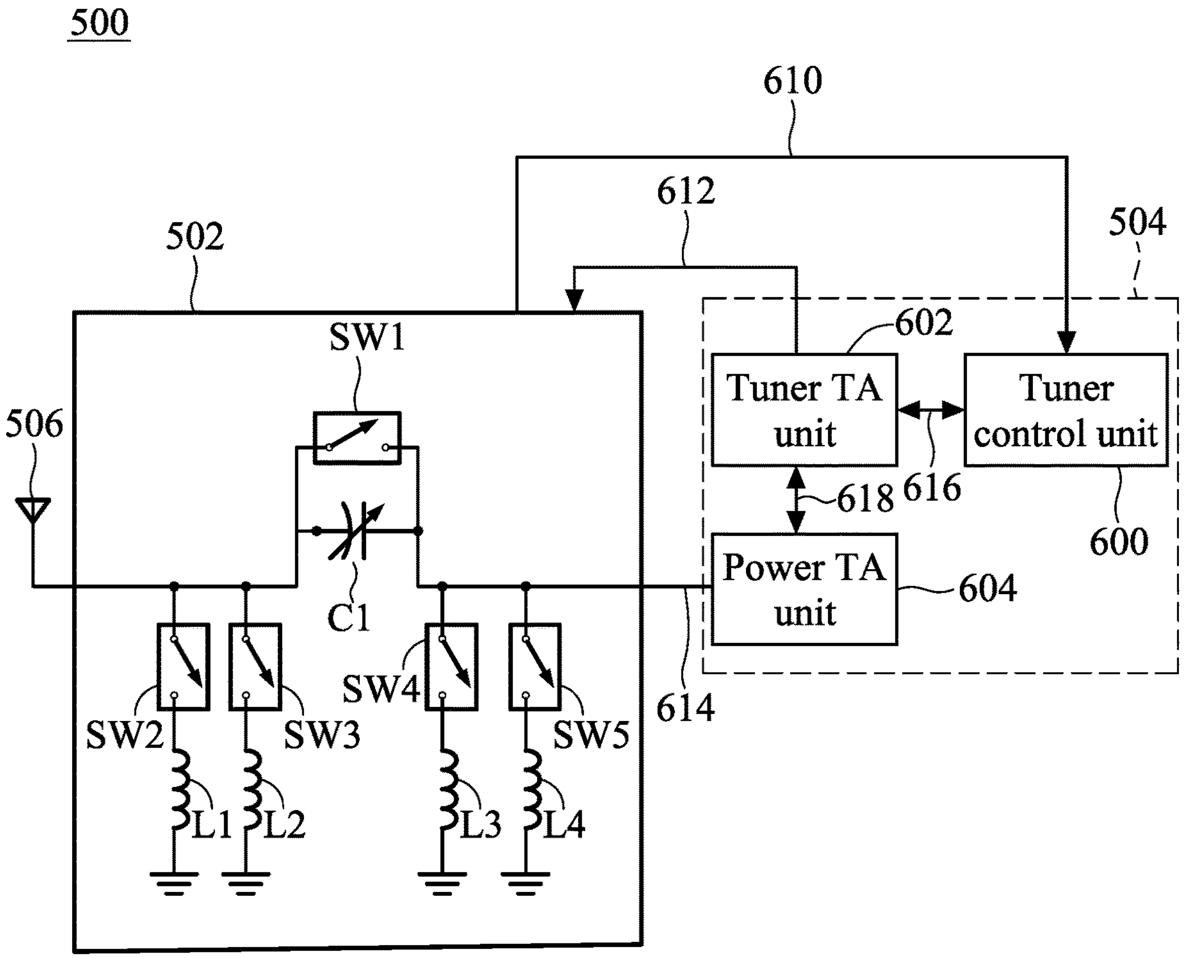
FIG. 6 is a detail schematic diagram of an electronic device 500 in accordance with some embodiments of the present invention.

FIG. 6 is a detail schematic diagram of an electronic device 500 in accordance with some embodiments of the present invention. As shown in FIG. 6, the RF modem 504 includes a tuner control unit 600, a tuner time-averaged (TA) unit 602, and a power TA unit 604. In some embodiments, the tuner control unit 600 receives the current tuner state from the antenna tuner 502 through a communication protocol 610. The tuner control unit 600 determines there is the suitable tuner state among the multiple tuner states based on the instant SAR level between the suitable tuner state and the current tuner state. In some embodiments, the tuner TA unit detects the variation of VSWR corresponding to the current tuner state. The tuner TA unit calculates whether the instant SAR level is higher than the threshold SAR level, and sends the setting command related to the suitable tuner state to the antenna tuner 502 through a communication protocol 612. The power TA unit 604 adjusts the TX power level corresponding to the current tuner state based on control commands from the tuner control unit 600 through communication protocols 616 and 618.

In some embodiments, the antenna tuner 502 includes a switch SW1, a variable capacitor C1, a switch SW2, a switch SW3, a switch SW4, a switch SW5, an inductor L1, an inductor L2, an inductor L3, and an inductor L4. In some embodiments, the antenna tuner 502 switches the tuner state by changing the state of at least one of switches SW1, SW2, SW3, SW4, and SW5, and/or by changing the capacitance of variable capacitor C1, but the present invention is not limited thereto. In some embodiments, switch SW1 is connected to variable capacitor C1 in parallel, and they are both electrically connected between the antenna 506 and the power TA unit 604 of the RF modem 504. The switch SW2 is electrically connected to inductor L1 in series, and they are electrically connected between the antenna 506 and the ground. The switch SW3 is electrically connected to inductor L2 in series, and they are electrically connected between the antenna 506 and the ground. The switch SW4 is electrically connected to inductor L3 in series, and they are electrically connected between the power TA unit 604 and the ground. The switch SW5 is electrically connected to inductor L4 in series, and they are electrically connected between the power TA unit 604 and the ground.

Figure 7:
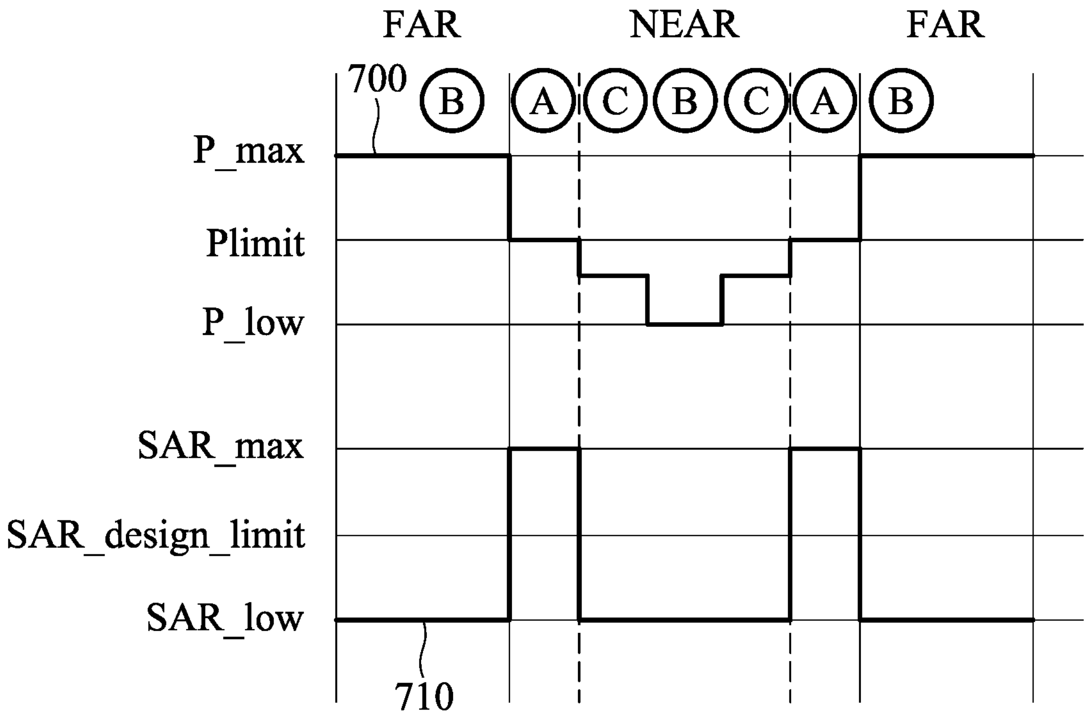
FIG. 7 is a relationship diagram of an instant power level 700, an instant SAR level 710, and the distance between the electronic device 500 and a user 520 in FIG. 5 in accordance with some embodiments of the present invention.

FIG. 7 is a relationship diagram of an instant power level 700, an instant SAR level 710, and the distance between the electronic device 500 and a user 520 in FIG. 5 in accordance with some embodiments of the present invention. Please refer to FIG. 5, FIG. 7, and Table 1 at the same time. In some embodiments of FIG. 7, the power level P_max is higher than the power level Plimit, and the power level Plimit is higher than the power level P_low. The SAR level SAR_max is higher than the SAR level SAR_design_limit, and the SAR level SAR_design_limit is higher than the SAR level SAR_low. In some embodiments, the power level Plimit and the SAR level SAR_design_limit are obtained from the SAR ECI table for certification standards, but the present invention is not limited thereto. As shown in FIG. 7, when the person 520 is far away from the electronic device 500 in the far-field (FAR), the tuner state B is first adopted, instant power level 700 is decreased to the power level P_max, resulting in that the SAR level is equal to the SAR level SAR_low. After that, when the person 520 is close to the electronic device 500 in the near-field (NEAR), the tuner state A is adopted, instant power level 700 is decreased to the power level Plimit, resulting in that the SAR level is equal to the SAR level SAR_max. Then, when the person 520 is further closer to the electronic device 500 the near-field (NEAR), the tuner state C is adopted, instant power level 700 is decreased to the average power level between the power levels Plimit and P_low, resulting in that the SAR level is equal to the SAR level SAR_low. Afterwards, when the person 520 is much closer to the electronic device 500 in the near-field (NEAR), the tuner state B is adopted, instant power level 700 is decreased to the power level P_low, resulting in that the SAR level is equal to the SAR level SAR_low.

Then, when the person 520 begins to be far away from the electronic device in the near-field (NEAR), the tuner state C is adopted, instant power level 700 is increased to the average power level between the power levels Plimit and P_low, resulting in that the SAR level is equal to the SAR level SAR_low. When the person 520 is further far away from the electronic device 500 in the near-field (NEAR), the tuner state A is adopted, instant power level 700 is increased to the power level Plimit, resulting in that the SAR level is equal to the SAR level SAR_max. When the person 520 is much farer away from the electronic device 500 in the far-field (FAR), the tuner state B is adopted, instant power level 700 is increased to the power level P_max, resulting in that the SAR level is equal to the SAR level SAR_low. The method for TA-SAR optimization of the present invention averages the SAR level obtained in the near-field to get an averaged SAR level. It is obviously that the averaged SAR level does not exceed the SAR level SAR_design_limit, the certification standards are met.

The advantage of controlling the near-field average SAR is that the near-field average SAR value can be controlled more precisely, and the conductive power has a gentler power control curve, so as to avoid being punished by the base station operator, so as to avoid the user's network speed from being slowed down. Furthermore, if it can be used with tuner-related active detection functions (such as detecting objects approaching and optimizing return loss), a group of active control loops for near-field TASAR can be established to achieve the ideal state of near-field SAR optimization in matching scenarios.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for time-averaged specific absorption rate (TA-SAR) optimization with an antenna tuner, wherein the antenna tuner has multiple tuner states, comprising:

calculating an instant SAR level that is higher than a threshold SAR level;

determining a suitable tuner state among the multiple tuner states based on the instant SAR level;

switching the tuner to the suitable tuner state to transmit signals with the TX power level corresponding to the suitable tuner state;

adjusting the TX power level corresponding to a current tuner state if there is no suitable tuner state among the multiple tuner states;

setting the suitable tuner state as the current tuner state;

detecting the variation of voltage standing wave ratio (VSWR) corresponding to the current tuner state; and determining there is no scene variation before calculating the instant SAR level that is higher than the threshold SAR level;

wherein the current tuner state is one of the multiple tuner states.

2. The method as claimed in claim 1, wherein the threshold SAR level is determined by a second table; the second table records the threshold SAR level corresponding to different scenes; and the second table is a SAR ECI table.

3. The method as claimed in claim 2, further comprising:

determining there is scene variation;

switching the second table based on the scene variation to obtain the threshold SAR level before calculating the instant SAR level that is higher than the threshold SAR level.

4. The method as claimed in claim 1, wherein the threshold SAR level is an average SAR level within a time window.

5. The method as claimed in claim 1, further comprising: keeping detecting the variation of voltage standing wave ratio (VSWR) corresponding to the current tuner state after calculating the instant SAR level that is lower than the threshold SAR level.

6. The method as claimed in claim 1, further comprising: calculating whether the instant SAR level is higher than the threshold SAR level after adjusting the TX power level corresponding to the current tuner state.

7. An electronic device, comprising:
an antenna tuner, having multiple tuner states; and
an RF modem, electrically connected to the antenna tuner, and configured to obtain a first table;
wherein the RF modem calculates an instant SAR level that is higher than a threshold SAR level, determines a suitable tuner state among the multiple tuner states based on the instant SAR level, sends a setting command related to the suitable tuner state to the antenna tuner, adjusts the TX power level corresponding to a current tuner state if the RF modem determines there is no suitable tuner state among the multiple tuner states, sets the suitable tuner state as the current tuner state, detects the variation of voltage standing wave ratio (VSWR) corresponding to the current tuner state, and determines there is no scene variation before calculating the instant SAR level;
wherein the antenna tuner is switched to the suitable tuner state to transmit signals with the TX power level corresponding to the suitable tuner state according to the setting command;
wherein the current tuner state is one of the multiple tuner states.

8. The electronic device as claimed in claim 7, wherein the RF modem sends the signals with the TX power level corresponding to the current tuner state to the antenna tuner for transmission.

9. The electronic device as claimed in claim 7, wherein the RF modem obtains a second table; the threshold SAR level is determined by the second table; the second table records the threshold SAR level corresponding to different scenes; and the second table is a SAR scenario table (ECI table).

10. The electronic device as claimed in claim 9, wherein the RF modem determines there is scene variation, and switches the second table based on the scene variation to obtain the threshold SAR level before calculating the instant SAR level.

11. The electronic device as claimed in claim 7, wherein the threshold SAR level is an average SAR level within a time window.

12. The electronic device as claimed in claim 7, wherein the RF modem keeps detecting the variation of voltage standing wave ratio (VSWR) corresponding to the current tuner state after calculating the instant SAR level that is lower than the threshold SAR level.

13. The electronic device as claimed in claim 7, wherein the RF modem calculates whether the instant SAR level is higher than the threshold SAR level after adjusting the TX power level corresponding to the current tuner state.

14. The electronic device as claimed in claim 7, wherein the RF modem comprises:
a tuner control unit, configured to receive the current tuner state from the antenna tuner, and determine the suitable tuner state among the multiple tuner states based on the instant SAR level;
a tuner time-averaged (TA) unit, configured to detect the variation of VSWR corresponding to the current tuner state, calculate whether the instant SAR level is higher than the threshold SAR level, and send the setting signal related to the suitable tuner state to the antenna tuner; and
a power TA unit, configured to adjust the TX power level corresponding to the current tuner state.

* * * * *